United States Patent Office  3,487,010
Patented Dec. 30, 1969

3,487,010
IRON-CONTAINING REFORMING CATALYST
Waldeen C. Buss, Richmond, Calif., assignor to Chevron Research Company, San Francisco, Calif., a corporation of Delaware
No Drawing. Filed Dec. 10, 1968, Ser. No. 782,729
Int. Cl. C10g 35/08
U.S. Cl. 208—138                                           10 Claims

ABSTRACT OF THE DISCLOSURE

Reforming a naphtha feed in the presence of hydrogen with a catalyst comprising from 0.01 to 3 weight percent of a platinum group component and 0.01 to 5 weight percent rhenium, associated with an alumina-containing support having 0.01 to 5 weight percent iron uniformly distributed throughout the alumina support, and the novel platinum-rhenium-iron catalyst.

Field of the invention

This invention relates to hydrocarbon reforming processes and more particularly to a novel catalytic composition and a process for reforming of a naphtha fraction in the presence of the novel catalyst.

Prior art

Catalytic reforming is well known in the petroleum industry and refers to the treatment of naphtha fractions to improve the octane rating. Catalysts for successful reforming processes should process good selectivity, that is, be able to produce high yields of high octane number gasoline products and accordingly, low yields of light gaseous hydrocarbons or carbonaceous byproducts. The catalysts should also exhibit good yield stability; that is, the yield of $C_5+$ gasoline product of certain octane number should not decrease appreciably during the prolonged period of reforming. Decreases in $C_5+$ liquid yield of only a few percent during the process represent a substantial economical loss. Another characteristic of good reforming catalysts is a low fouling rate; that is, the rate of increase in temperature necessary to maintain conversion of the feed to a constant octane number gasoline product should be relatively low. Rapid fouling of the catalyst leads to early shutdown of the reforming process and subsequent regeneration of the catalyst. A low fouling rate indicates high temperature stability.

Catalysts comprising platinum group components, for example, platinum supported on alumina, are well known and widely used for the reforming of naphthas and gasoline boiling range materials in order to produce high octane gasolines. Platinum catalysts, however, are very expensive due to the high cost of platinum and probably will become even more expensive as a result of the restricted availability of the metal. These economic factors have led the petroleum industry to seek less expensive substitutes for platinum and/or to investigate catalytic promoters to use with platinum catalysts to increase their activity, yield stability and/or temperature stability, etc., thereby making platinum catalysts more economical for reforming operations.

In application Ser. No. 639,719, filed May 19, 1967, and now Patent No. 3,415,737 which is a continuation-in-part of application Ser. No. 560,166, filed June 24, 1966, now abandoned, a catalyst composition comprising platinum and rhenium in association with a carrier, for example, alumina, was disclosed as being highly desirable for reforming processes. The presence of rhenium with the platinum-containing catalytic composite was found to enhance the yield stability of the catalyst as compared to a catalyst comprising platinum without rhenium.

Iron has been disclosed in U.S. Patent No. 3,379,641 as a promoter for increasing the yield stability of platinum-containing catalysts. However, the presence of iron did not improve the temperature stability, and, if anything, resulted in a deleterious decrease in the temperature stability of the catalyst. It was found necessary to continually add a halogn to the reforming process in order to improve the temperature stability, i.e. decrease the fouling rate, of the catalyst, thereby making the process commercially useful.

SUMMARY OF THE INVENTION

It has now been found that a catalyst composition comprising a platinum group component and rhenium in association with an alumina-containing support having iron uniformly distributed throughout said alumina support has not only excellent yield stability but also an unexpectedly low fouling rate, that is unexpectedly high temperature stability. The temperature stability of the catalyst is remarkably high without the necessity of continually adding a halogen to the reforming process as disclosed in the prior art. The catalyst of the present invention comprises from 0.01 to 3 weight percent of a platinum group component and from 0.01 to 5 weight percent rhenium in association with an alumina-containing support or matrix. Iron in an amount of from 0.01 to 5 weight percent, based on the finished catalyst, is uniformly distributed throughout the alumina-containing matrix and is preferably present with the alumina by coprecipitation or cogelation.

The present invention also comprises reforming a naphtha feedstock at reforming conditions in the presence of hydrogen with the novel catalyst.

DESCRIPTION OF THE INVENTION

The support or matrix with which catalytically active amounts of the platinum group component and rhenium are associated comprises alumina with a small amount of iron being uniformly distributed throughout the alumina matrix. Any of the forms of alumina suitable as a support for reforming catalysts can be used. Furthermore, alumina can be prepared by a variety of methods satisfactory for the purposes of this invention. Thus, the alumina may be prepared by adding a suitable alkaline agent such as ammonium hydroxide to a salt of aluminum, such as aluminum chloride, aluminum nitrate, etc., in an amount to form aluminum hydroxide which on drying and calcining is converted to alumina. Alumina may also be prepared by the reaction of sodium aluminate with a suitable reagent to cause precipitation thereof with the resulting formation of reaction of metallic aluminum with hydrochloric acid, acetic acid, etc., in order to form a hydrosol which can be gelled with a suitable precipitating agent, such as, ammonium hydroxide, followed by drying and calcination.

Other porous inorganic oxides can be present with the alumina. Thus, for example, porous inorganic oxides, such as, silica, zirconia, magnesia, and combinations thereof, may be present. The alumina should preferably be present, however, in an amount of at least 10 weight percent, and preferably 20 weight percent, based on the finished catalyst composite.

For purposes of the present invention, iron should be uniformly distributed throughout the alumina-containing matrix or support. The iron may exist in the elemental state or in any combined form, such as iron sulfide, iron oxide, etc. Iron should be present in an amount of from 0.01 to 5 weight percent and preferably from 0.01 to 1 weight percent, based on the finished catalyst composite. The weight percent of the iron is based on the metal even though the iron may exist in the composite in some combined form. The iron component can be associated with the alumina component in any suitable manner to achieve a uniform distribution of iron throughout the alumina. It is generally preferred to commingle an iron-containing compound with the aluminum salt or the aluminum hydrosol prior to formation of the alumina particles in order to insure uniform distribution of the iron throughout the alumina-containing carrier. Any suitable iron-containing compound can be utilized; but it is generally preferable to utilize an iron salt, such as, iron chloride, iron bromide, iron acetate, iron fluoride, iron formate, iron iodide, iron nitrate, etc. Preferably the iron exists with the alumina as a coprecipitated or a cogelled composite of the two materials. Impregnation of the iron on the alumina is generally not desired for purposes of the present invention because of the difficulty of obtaining a uniform distribution of the iron throughout the alumina matrix.

The catalyst of the present invention should comprise a platinum group component in an amount of from 0.01 to 3 weight percent and preferably from 0.1 to 1 weight percent, based on the finished catalyst. The "platinum group component" embraces all the members of Group VIII of the Periodic Table having an atomic weight greater than 100 as well as compounds and mixtures of any of these. Thus, the platinum group components are the Group VIII noble metals. Platinum is preferred because of its better performance in reforming. The concentration of rhenium in the finished catalyst composite is preferably in the range of from 0.01 to 5 weight percent and more preferably 0.1 to 2 weight percent. It is preferred that the rhenium to platinum group component atom ratio be from about 0.2 to 2.0 and more preferably that the atom ratio of rhenium to platinum group component not exceed 1.0. The platinum group component and rhenium can be associated with the alumina-containing composite by various methods. The platinum group component and rhenium can be disposed on the alumina-containing composite in intimate admixture with each other by a suitable technique such as ion-exchange, coprecipitation, impregnation, etc. It is not necessary that the metals be incorporated onto the porous alumina support by the same technique. One of the metals can be associated with the alumina by one method, such as, for example, impregnation, and the other metal associated with the alumina by another technique, such as, for example, coprecipitation. Furthermore, the metals can be associated with the alumina either sequentially or simultaneously. It is generally preferred that the metals be associated with the alumina by impregnation, either sequentially or simultaneously. In general the alumina is impregnated with an aqueous solution of a decomposable compound of the metal in sufficient concentration to provide the desired quantity of the metal on the finished catalyst. To incorporate the preferred platinum group component, platinum, onto the alumina by impregnation, chloroplatinic acid is preferred. Other platinum group compounds are ammonium chloroplatinates, polyammine-platinum salts, palladium chloride, etc. Rhenium is suitably incorporated onto the metal by impregnation with perrhenic acid. Ammonium, or potassium perrhenates, among others, can also be used.

The platinum group component and rhenium can be associated with the carrier at any stage of the catalyst preparation. For example, the metals can be incorporated onto the alumina support while the alumina is in the gel or sol form. The platinum group component and rhenium can be incorporated with the alumina prior to, during or following the addition of iron to the alumina. Generally, the catalyst is preferably prepared by incorporating the metals, e.g., platinum and rhenium, onto a previously prepared porous alumina carrier having iron uniformly distributed throughout. The metals are desirably uniformly distributed on the surface of the carrier, preferably in intimate admixture with each other on the support.

Following incorporation of the carrier material with the platinum group component and rhenium, the resulting composite is usually dried by heating at a temperature of, for example, no greater than about 500° F. and preferably at about 200 to 400° F. Thereafter the composite can be calcined at an elevated temperature, for example, up to about 1200° F., if desired.

The catalyst containing the platinum group component and rhenium is preferably heated at an elevated temperature to convert the platinum group component and rhenium to the metallic state. Preferably the heating is performed in the presence of hydrogen, or preferably dry hydrogen. It is particularly preferred that this prereduction be accomplished at a temperature in the range of 600 to 1300° F., and preferably 600 to 1000° F.

The catalyst can be promoted for reforming by the addition of halides, particularly fluoride or chloride. Bromides may also be used. The halides apparently provide a limited amount of acidity to the catalyst which is beneficial to most reforming operations. A catalyst promoted with halide preferably contains from 0.1 to 3 weight percent total halide content. The halides can be incorporated onto the catalyst carrier at any suitable stage of catalyst manufacture, e.g., prior to or following incorporation of the platinum group component and rhenium. Some halide is often incorporated onto the carrier when incorporating iron with the alumina matrix; e.g., incorporation of iron chloride with the alumina matrix results in chloride addition to the carrier. Halides are also incorporated onto the carrier by impregnating with the platinum group component; that is, for example, impregnation with chloroplatinic acid normally results in chloride addition to the carrier. Additional halide may also be incorporated onto the alumina if desired. In general, the halides are combined with the alumina by contacting suitable compounds such as hydrogen fluoride, ammonium fluoride, hydrogen chloride, or ammonium chloride, either in the gaseous form or in a water soluble form with the alumina. Preferably the fluoride or chloride is incorporated onto the carrier from an aqueous solution containing the halide.

The catalyst can be sulfided prior to contact with the feed in the reaction zone. Sulfiding the catalyst prior to contact with the naphtha helps to reduce the production of light hydrocarbon gases during startup. The presulfiding can be done in situ or exsitu by passing a sulfur-containing gas, for example, $H_2S$, in the presence of hydrogen over the catalyst. Other presulfiding treatments are known in the prior art. Also, it has been found that on startup a small amount of sulfur, for example, $H_2S$, or dimethyldisulfide, added to the reforming zone with the feed helps reduce the initial hydrocracking activity of the catalyst. The sulfur can be introduced in any convenient manner and at any convenient location. It can be contained in the liquid hydrocarbon feed, the hydrogen-rich gas, a recycle gas stream, or any combination. Generally, during the reforming process any sulfur contained on the catalyst is stripped from the catalyst and will thus be removed from the reaction zone.

The feedstock to be employed in the reforming operation is a light hydrocarbon oil, for example, a naphtha fraction. Generally, the naphtha will boil in the range falling within the limits of from 70 to 550° F. and preferably 150 to 450° F. The feedstock can be either a straight-run naphtha or a thermally cracked or catalytically cracked naphtha or blends thereof. Preferably the feed should be substantially free of sulfur, that is, the feed should preferably contain less than about 10 p.p.m. sulfur, more preferably less than 5 p.p.m. sulfur, and still more preferably less than 1 p.p.m. sulfur. The sulfur content is determined as weight of sulfur to weight of feed.

In the case of a feedstock which is not already low in sulfur, acceptable levels can be reached by hydrogenating the feedstock in a presaturation zone where the naphtha is contacted with a hydrogenation catalyst which is resistant to sulfur poisoning. A suitable catalyst for this hydrodesulfurization process is, for example, an alumina-containing support with a minor proportion of molybdenum oxide and cobalt oxide. Hydrodesulfurization is ordinarily conducted at a temperature of from 700 to 850° F., a pressure of from 200 to 2000 p.s.i.g., and a liquid hourly space velocity of from 1 to 5. The sulfur contained in the naphtha is converted to hydrogen sulfide which can be removed prior to reforming by suitable conventional processes.

The reforming conditions used in the present invention will depend in large measure on the feed used, whether highly aromatic, paraffinic, or naphthenic, and upon the desired octane rating of the product. The temperature in the reforming operation will generally be in the range of about 600 to 1100° F. and preferably about 700 to 1050° F. The pressure in the reforming reaction will in general lie within the range from about 25 to 1000 p.s.i.g. and preferably from about 50 to 750 p.s.i.g. The temperature and pressure can be correlated with the liquid hourly space velocity (LHSV) to favor any particularly desirable reforming reaction as, for example, aromatization or isomerization or dehydrogenation In general, the liquid hourly space velocity will be from 0.1 to 10 and preferably from 1 to 5.

Reforming of a naphtha is accomplished by contacting the naphtha at reforming conditions and in the presence of hydrogen with the desired catalyst. Reforming generally results in the production of hydrogen. The hydrogen produced during the reforming process is generally recovered from the reaction products, and, preferably, at least part of said hydrogen is recycled to the reaction zone. Thus excess hydrogen need not necessarily be added to the reforming system. However, it is usually preferred to introduce excess hydrogen at some stage during the operation as, for example, during startup. The hydrogen can be introduced into the feed prior to contact with the catalyst or can be contacted simultaneously with the introduction of the feed to the reaction zone. Generally, the hydrogen is recirculated over the catalyst prior to contact of the feed with the catalyst. The pressure of hydrogen serves to reduce the formation of coke which tends to poison the catalyst. Moreover, the presence of hydrogen can be used to favor certain reforming reactions, e.g., isomerization, or hydrocracking. Hydrogen is preferably introduced into the reforming reactor at a rate varying from about 0.5 to about 20 moles of hydrogen per mole of feed. The hydrogen can be in admixture with light gaseous hydrocarbons.

If desired, several reactors containing catalyst of the present invention can be used. Further, if desired, a higher space velocity ca nbe used in the first reactors than in the last reactors with higher catalyst temperatures existing in the last reactors. Also, layered beds of catalyst can be used; e.g., a commercial platinum-alumina catalyst bed can be used above or below a bed of catalyst of the present invention. Other variations can also be used without departing from the scope of the present invention.

After a period of operation when the catalyst becomes deactivated by the presence of carbonaceous deposits, the catalyst can be reactivated or regenerated by passing an oxygen-containing gas, such as air, into contact with the catalyst at an elevated temperature in order to burn carbonaceous deposits from the catalyst. The method of regenerating the catalyst will depend on whether there is a fixed bed, moving bed, or fluidized bed operation. Regeneration methods and conditions are well known in the art.

The process of the present invention will be more readily understood by reference to the following example.

EXAMPLE

A catalyst of the present invention (Catalyst A) was prepared as follows: 40.5 grams of 99.99 percent pure aluminum metal was mixed with 500 milliliters of a solution containing 120 gm. of aluminum chloride

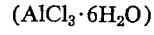
$(AlCl_3 \cdot 6H_2O)$

The above sol was mixed with hydrochloric acid to adjust the aluminum/chloride ratio, and then aged for about three days. After aging, the sol was mixed with 50 ml. of a solution containing 0.356 gm. of ferrous chloride

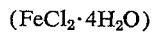
$(FeCl_2 \cdot 4H_2O)$

Sufficient iron was used to provide the finished catalyst with 0.1 weight percent iron. A solution containing hexamethylenetetramine was added to the above sol containing alumina and iron. The resulting cogel was hot aged at 200° F. for 24 hours. Two percent ammonium hydroxide solution was then added and the resulting composite aged at 200° F. for 3 hours. After washing, the resulting alumina-iron cogelled particles were filtered, dried, and then calcined at 1200° F. for 4 hours.

The alumina-iron containing particles were then impregnated with a chloroplatinic acid solution of sufficient concentration to provide the finished catalyst with about 0.6 weight percent platinum. The particles were then dried at 100° F. and then impregnated with a perrhenic acid solution of sufficient concentration to provide the finished catalyst with about 0.6 weight percent rhenium. Thereafter the platinum-rhenium-alumina-iron composite was dried and calcined. Prior to reforming, the catalyst was reduced in hydrogen and sulfided by contact with $H_2S$. The resulting catalyst contained 0.8 weight percent chloride.

For comparison purposes several other catalysts were prepared. Catalyst B, comprising 0.6 weight percent platinum associated with alumina containing 0.1 weight percent iron uniformly distributed throughout the alumina matrix, was prepared in a manner similar to that of Catalyst A except that rhenium was not associated with the catalyst. Catalyst B contained 0.8 weight percent chloride. Catalyst C, comprising platinum supported on alumina, was obtained commercially. The catalyst comprised 0.6 weight percent platinum and 0.6 weight percent chloride. Catalyst D, comprising 0.6 weight percent platinum, 0.6 weight percent rhenium, and 0.6 weight percent chloride, was prepared by impregnating Catalyst C with perrhenic acid. Catalyst E, comprising platinum and iron associated with alumina, was prepared by impregnating the catalyst with both platinum and iron. The catalyst contained 0.6 weight percent platinum and 0.6 weight percent iron.

The catalysts were tested for reforming of a naphtha feedstock having a boiling range of 151 to 428° F. and comprising 23.4 volume percent aromatics, 36.5 volume percent paraffins, and 40.1 volume percent napthenes. The feed was essentially sulfur-free. Reforming conditions included a pressure of 160 p.s.i.g., a liquid hourly space velocity of 4, and a hydrogen to hydrocarbon mole ratio of 4; once-through hydrogen was used. The temperature was adjusted to maintain conversion to 99 F-1 clear octant product. The reforming process for each catalyst was terminated when the temperature necessary to maintain a 99 F-1 clear octane product reached about 1000° F.

The fouling rate in °F./hr., that is, the increase in temperature necessary to maintain conversion of the feed to 99 F-1 clear octane product, was measured for each catalyst. The fouling rate gives an indication of the temperature stability of the catalyst. The lower the fouling rate, the better the temperature stability of the catalyst. Also the initial temperature, that is, the temperature at start of run, to obtain 99 F-1 clear octane product was measured. The initial temperature gives an indication of the activity of the catalyst for reforming; the lower the initial temperature, the more active the catalyst. The change in $C_5+$ yield over the initial 50° F. temperature increase was also measured for several of the reforming tests to give an indication of the yield stability of the catalysts. A negative number indicates that the yield decreased over the temperature interval concerned. Results of the reforming tests with Catalysts A through E are reported in the Table.

TABLE

| Catalyst | Fouling rate | Starting temp. | Change in yield of $C_5+$ products vol. percent |
|---|---|---|---|
| Catalyst A (Pt-Re-Cogelled Fe-$Al_2O_3$) | 0.7 | 936 | +1.0 |
| Catalyst B (Pt.Cogelled Fe-$Al_2O_3$) | 1.4 | 945 | −2.5 |
| Catalyst C (Pt-$Al_2O_3$) | 1.7 | 940 | −4.5 |
| Catalyst D (Pt-Re-$Al_2O_3$) | 1.1 | 932 | 0 |
| Catalyst E (Pt-Impregnated Fe-$Al_2O_3$) | 8.0 | 953 | −3.0 |

It is observed from the data in the Table that the catalyst of the present invention (Catalyst A) had an unexpectedly low fouling rate compared to the other catalysts tested. Also the activity of Catalyst A, as measured by the starting temperature, was higher than any of the other catalysts tested with the exception of Catalyst D. Furthermore, the yield stability of Catalyst A as measured by the change in $C_5+$ yield, was better than the other catalysts tested.

The foregoing disclosure of this invention is not to be considered as limiting since many variations can be made by those skilled in the art without departing from the scope or spirit of the appended claims.

I claim:

1. A process for reforming a naphtha feedstock which comprises contacting said feedstock at reforming conditions in the presence of hydrogen with a catalytic composite of from 0.01 to 3 weight percent of a platinum group component and from 0.01 to 5 weight percent rhenium associated with an alumina-containing support having iron in an amount from 0.01 to 5 weight percent intimately distributed throughout said alumina-containing support.

2. The process of claim 1 wherein said platinum group component is platinum.

3. The process of claim 1 wherein said feedstock contains less than about 10 p.p.m. by weight sulfur.

4. The process of claim 1 wherein said catalyst contains from 0.01 to 3 weight percent halide.

5. The process of claim 4 wherein said halide is chloride.

6. The process of claim 1 wherein said platinum group component is present in an amount from 0.1 to 1 weight percent and said rhenium is present in an amount from 0.1 to 2 weight percent.

7. A catalyst comprising 0.01 to 3 weight percent of a platinum group component and 0.01 to 5 weight percent rhenium in association with an alumina-containing support having iron in an amount of from 0.01 to 5 weight percent, based on the finished catalyst, uniformly distributed throughout said alumina-containing support.

8. The catalyst of claim 7 wherein said platinum group component is platinum.

9. The catalyst of claim 7 wherein halide in an amount from 0.01 to 3 weight percent is present.

10. A catalyst comprising a cogelled composite of iron and alumina having platinum and rhenium in association therewith, platinum being present in an amount from 0.01 to 3 weight percent, rhenium being present in an amount from 0.01 to 5 weight percent and iron being present in an amount from 0.01 to 5 weight percent.

References Cited

UNITED STATES PATENTS

| | | | |
|---|---|---|---|
| 3,379,641 | 4/1968 | Hayes | 208—139 |
| 3,413,213 | 11/1968 | Hayes | 208—139 |
| 3,415,737 | 12/1968 | Kluksdahl | 208—139 |

HERBERT LEVINE, Primary Examiner

U.S. Cl. X.R.

208—139; 252—466

PO-1050
(5/69)

UNITED STATES PATENT OFFICE
CERTIFICATE OF CORRECTION

Patent No. 3,487,010          Dated December 30, 1969

Inventor(s) Waldeen C. Buss

It is certified that error appears in the above-identified patent and that said Letters Patent are hereby corrected as shown below:

Col. 2, line 51: "resulting formation of reaction of metallic..." should read --resulting formation of aluminum hydroxide gel. Also, alumina may be prepared by the reaction of metallic...--.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents